No. 691,269.  Patented Jan. 14, 1902.
G. JOHNSON, Jr.
CUTTER HEAD.
(Application filed May 22, 1900.)

(No Model.)

Witnesses:
A. L. Caudler
Frank B. Chaplain.

Inventor:
Greenleaf Johnson, Jr.
by Wm. K. J. Howard
Atty.

UNITED STATES PATENT OFFICE.

GREENLEAF JOHNSON, JR., OF BALTIMORE, MARYLAND.

CUTTER-HEAD.

SPECIFICATION forming part of Letters Patent No. 691,269, dated January 14, 1902.

Application filed May 22, 1900. Serial No. 17,513. (No model.)

*To all whom it may concern:*

Be it known that I, GREENLEAF JOHNSON, Jr., of the city of Baltimore, in the State of Maryland, have invented certain Improvements in Cutter-Heads and their Arbors for Wood-Planing Machines, of which the following is a specification.

This invention relates to means to effect the movement of the cutter-head of a wood-planing machine longitudinally of the shaft or arbor to which it is attached in order to admit of lateral adjustment of the said head with reference to the bed of the machine or to a plank or board having a fixed position thereon, as will hereinafter fully appear.

In the further description of the said invention which follows reference is made to the accompanying drawings, forming a part hereof, and in which—

Figure 1:
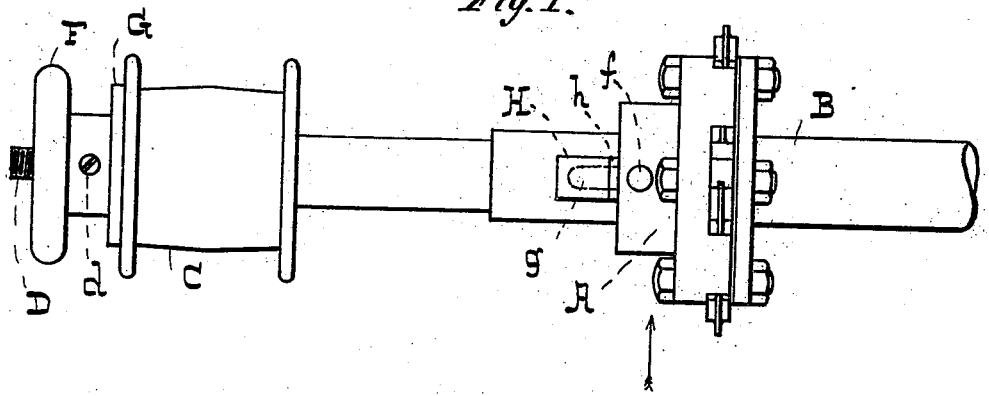
Figure 2:
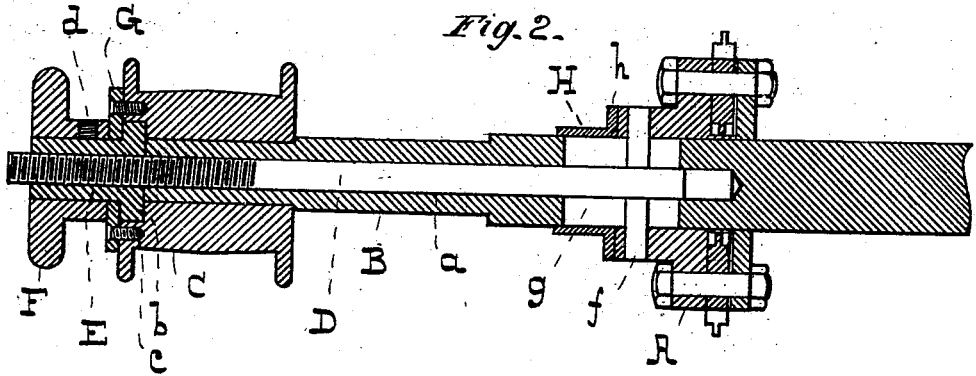

Figure 1 is an exterior side view of a part of a shaft or arbor carrying a cutter-head, which is adjustable in position thereon in accordance with the present invention. Fig. 2 is a central section of Fig. 1 looking in the direction indicated by the arrow.

Referring now to the drawings, A represents the cutter-head of a wood-planing machine. The head shown in the drawings has a general construction commonly employed in tongue-and-groove flooring-machines to cut a channel lengthwise of a board, and as far as the cutting elements of the head are concerned it presents nothing new or patentable. B is the arbor or shaft on which the said head is adapted to slide longitudinally.

C is the pulley whereby the shaft B and its cutter-head are rotated.

The arbor is axially bored, the hole *a* extending from the outer end of the arbor to a point about coincident with the face of the cutter-head. Into this hole is inserted a stem D, which at its outer end is threaded and provided with a nut E, having a hand-wheel F, whereby the nut may be turned. The nut has a collar *b*, which fits in a recess in the face of the pulley C, and its withdrawal from the said recess is prevented by an annular plate G, held to the pulley by screws *c*. A set-screw *d* holds the hand-wheel to the nut E. The stem D at its inner end is provided with a transverse key *f*, which passes through a slot *g* in the arbor and extends at both ends into or through the hub of the cutter-head A.

To prevent shavings and dirt from entering the slot *g*, the same is covered by plates H, the flanges *h* of which are attached to and move with the head.

It will be seen that the key *f* not only serves to effect a movement of the cutter-head longitudinally of the arbor through the medium of the threaded stem D, the nut E, and the hand-wheel F, but also serves as a driver to communicate the rotary motion of the arbor to the cutter-head.

I claim as my invention—

1. In combination with an arbor of a wood-planing machine, which is axially bored and provided with a transverse slot situated near the end of the bore, a cutter-head adapted to slide longitudinally of the said arbor, a stem loose in the bored portion of the arbor, having at its inner end a key which passes through the transverse slot in the arbor and enters the cutter-head, and at the outer end threaded, a nut on the threaded portion of the said stem, adapted to turn independently of the arbor, means to prevent longitudinal movement of the nut independently of the arbor, and a hand-wheel whereby the said nut may be turned to adjust the said cutter-head longitudinally of the arbor, substantially as specified.

2. In combination with the arbor of a wood-planing machine, which is axially bored and provided with a transverse slot situated near the end of the bore, a cutter-head adapted to slide longitudinally of the said arbor, a stem loose in the bored portion of the arbor having at its inner end a key which passes through the transverse slot in the arbor and enters the cutter-head, and at the outer end is threaded, a nut on the threaded portion of the said stem adapted to turn independently of the arbor, means to prevent longitudinal movement of the nut independently of the arbor, a hand-wheel whereby the said nut may be turned to adjust the said cutter-head longitudinally of the arbor, and plates attached to the cutter-head to cover the exposed portion of the transverse slot, substantially as specified.

GREENLEAF JOHNSON, JR.

Witnesses:
JOHN W. HEWES,
WM. T. HOWARD.